United States Patent
Nakata

(10) Patent No.: US 8,717,597 B2
(45) Date of Patent: May 6, 2014

(54) INFORMATION PROCESSING APPARATUS, PRINT CONTROL METHOD, AND STORAGE MEDIUM FOR SELECTIVELY PERFORMING INCONSISTENCY VALIDATION PROCESS ON CHANGED PRINT SETTING

(75) Inventor: Hiroaki Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 12/577,087

(22) Filed: Oct. 9, 2009

(65) Prior Publication Data

US 2010/0118332 A1 May 13, 2010

(30) Foreign Application Priority Data

Nov. 7, 2008 (JP) ................................. 2008-287178

(51) Int. Cl.
*G06F 3/12* (2006.01)
*G06K 15/00* (2006.01)

(52) U.S. Cl.
USPC ........................................ 358/1.15; 358/1.14

(58) Field of Classification Search
None
See application file for complete search history.

(56) References Cited

U.S. PATENT DOCUMENTS

| | | | |
|---|---|---|---|
| 7,499,196 B2 | 3/2009 | Nakata et al. | |
| 7,586,639 B2 | 9/2009 | Nakata | |
| 7,817,294 B2 | 10/2010 | Mitsui | |
| 2003/0161536 A1* | 8/2003 | Iwamura et al. | 382/218 |
| 2007/0005561 A1* | 1/2007 | Sakura et al. | 707/1 |
| 2007/0283155 A1* | 12/2007 | Kato | 713/171 |
| 2008/0174811 A1* | 7/2008 | Tanaka et al. | 358/1.15 |
| 2009/0091781 A1* | 4/2009 | Nishimura | 358/1.15 |

FOREIGN PATENT DOCUMENTS

| | | |
|---|---|---|
| JP | 2003-296063 | 10/2003 |
| JP | 2006-164240 A | 6/2006 |
| JP | 2008-55914 A | 3/2008 |

OTHER PUBLICATIONS

Japanese Office Action dated Jan. 7, 2013 issued in corresponding Japanese Patent Application No. 2008-287178.

* cited by examiner

*Primary Examiner* — Fan Zhang
(74) *Attorney, Agent, or Firm* — Fitzpatrick, Cella, Harper & Scinto

(57) ABSTRACT

The inconsistencies of the function included in the print setting resolving process is conducted, and information to indicate that the aforementioned print setting is not been changed is added. Then, based on the added information, it is determined whether the information regarding the print setting is changed or not. Here, in case the data related to print setting is added and also the print setting has not been changed, then the process is not conducted. Moreover, in case the data related to print setting is not added or the print setting has been changed, the process is conducted.

12 Claims, 17 Drawing Sheets

F I G. 5
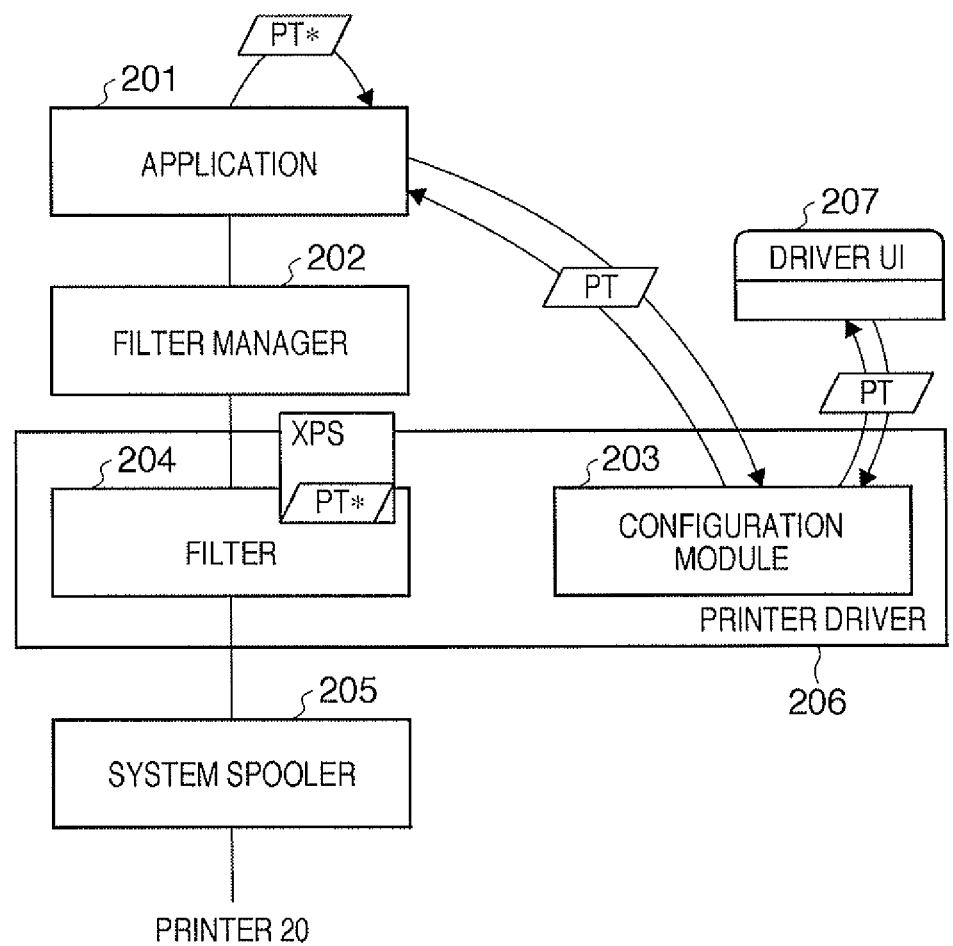

FIG. 8

```
<PrintTicket>
<Feature name="PageOrientation"><Option name="Portrait"/></Feature>
<Feature name="DocumetCollate"><Option name="Collated" /></Feature>
  :
<Feature name="JobInputBin"><Option name="AutoSelect" /></Feature>
<Signature xmlns="http://www.w3.org/2000/09/xmldsig#">
  <SignedInfo>
    <SignatureMethod Algorithm="http://www.w3.org/2000/09/xmldsig#dsa-sha1"/>
    <Reference URI="">
      <DigestMethod Algorithm="http://www.w3.org/2000/09/xmldsig#sha1"/>
      <DigestValue>90dfjdo84=3nm290</DigestValue>
    </Reference>
  </SignedInfo>
</Signature>
</PrintTicket>
```

PRINT SETTING DESCRIPTION PART

SIGNATURE PART

F I G. 9A
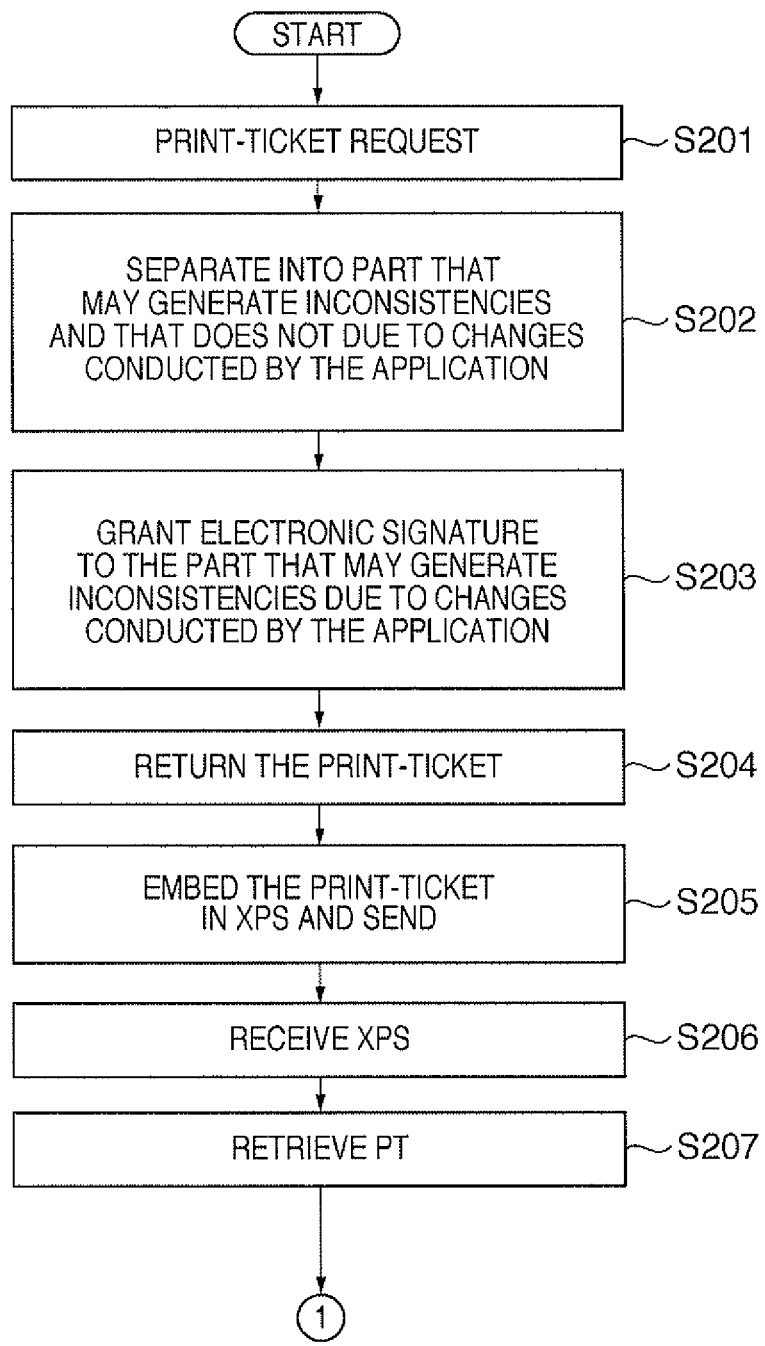

FIG. 10

```
<PrintTicket>
<Feature name="PageOrientation"><Option name="Portrait"/></Feature>      ⎫
<Feature name="DocumetCollate"><Option name="Collated" /></Feature>      ⎬  THE PART THAT MANY GENERATE
  :                                                                       ⎪  INCONSISTENCIES DUE TO
<Feature name="JobInputBin"><Option name="AutoSelect" /></Feature>       ⎭  CHANGES BY THE APPLICATION
<Signature>                                                               ⎫
  <SignedInfo>                                                            ⎪
      <DigestValue>90dfjdo84=3nm290</DigestValue>                         ⎬  THE SIGNATURE
  </SignedInfo>                                                           ⎪  PART OF THE ABOVE PART
</Signature>                                                              ⎭
<ParameterInit name="JobCopy"><Value>1</Value></ParameterInit>           ⎫
  :                                                                       ⎬  THE PART THAT DOES NOT
<Feature name="JobImageCompression"><Option name="PNG" /></Feature>      ⎪  GENERATE INCONSISTENCIES DUE
</PrintTicket>                                                            ⎭  TO CHANGES BY THE APPLICATION
```

F I G. 11
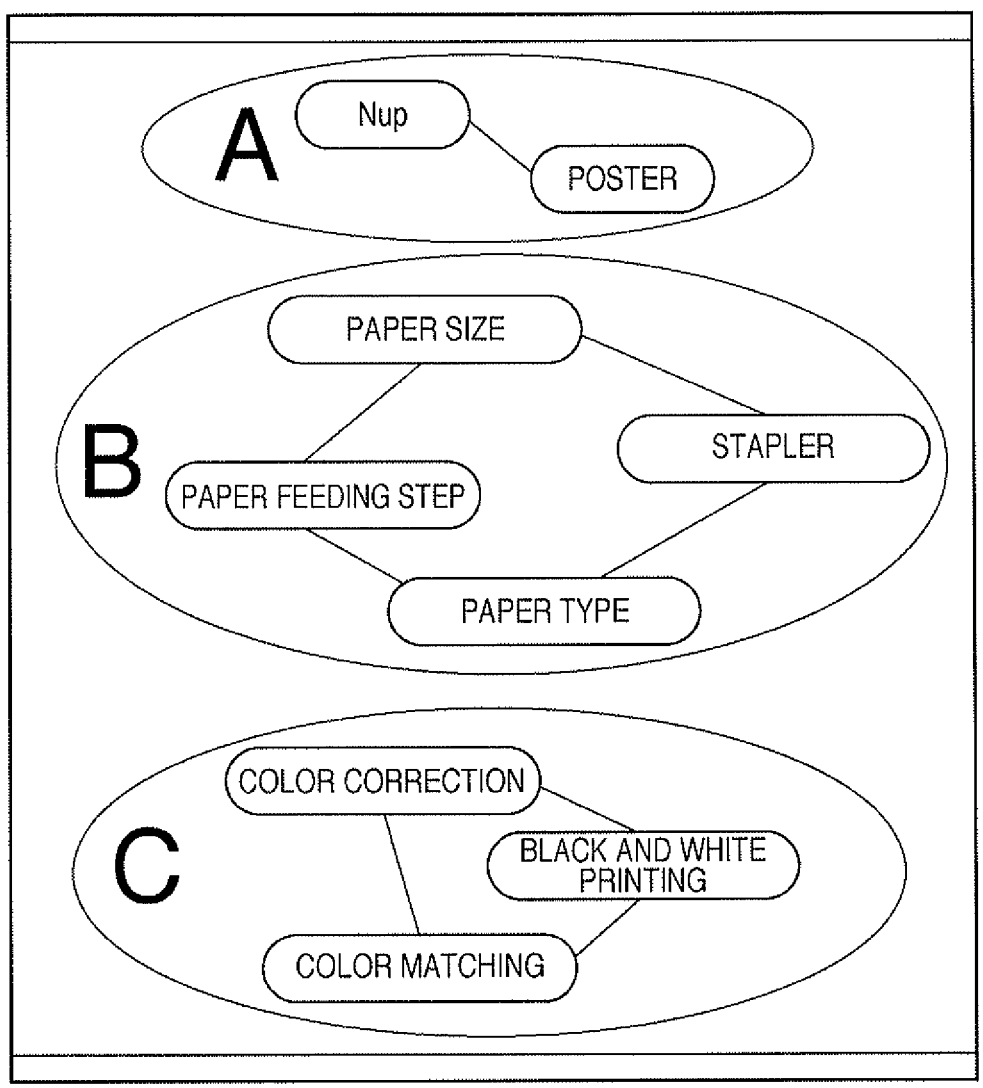

FIG. 14

```
<PrintTicket>
<Feature name="PageMediaSize" group="A"><Option name="Letter"/></Feature>
<Feature name="PageKyuanos" group="B"><Option name="ON"/></Feature>
<Feature name="JobStaple" group="A"><Option name="TopLeft"/></Feature>
<Feature name="PageOutputColor" group="B"><Option name="Monochrome"/></Feature>
</PrintTicket>
```
1401

```
<Feature name="PageMediaSize" group="A"><Option name="Letter"/></Feature>
<Feature name="PageColorManagement" group="B"><Option name="ON"/></Feature>
<Feature name="PageKyuanos" group="B"><Option name="ON"/></Feature>
<Feature name="JobStaple" group="A"><Option name="TopLeft"/></Feature>
<Feature name="PageOutputColor" group="B"><Option name="Monochrome"/></Feature>
```
1402 → b/BCAAa=BSAC
        whQ/+jsuWUfn

```
<PrintTicket>
<Feature name="PageMediaSize" group="A"><Option name="Letter"/></Feature>
<Feature name="PageColorManagement" group="B"><Option name="ON"/></Feature>
<Feature name="JobStaple" group="A"><Option name="TopLeft"/></Feature>
<Feature name="PageOutputColor" group="B"><Option name="Monochrome"/></Feature>
<Signature group="A"><DigestValue>b/BCAAa=BSAC</DigestValue></Signature>
<Signature group="B"><DigestValue>whQ/+jsuWUfn</DigestValue></Signature>
</PrintTicket>
```
1403

INFORMATION PROCESSING APPARATUS, PRINT CONTROL METHOD, AND STORAGE MEDIUM FOR SELECTIVELY PERFORMING INCONSISTENCY VALIDATION PROCESS ON CHANGED PRINT SETTING

BACKGROUND OF THE INVENTION

1. Field of the Invention

The present invention relates to an information processing apparatus and a print control method.

2. Description of the Related Art

It is well known in printing of documents figures and etc., created using a computer application utilizing a printer, a printer driver which corresponds to the printer first converts the application data into print data before sending the information to the printer.

Among these printer drivers, the XPS driver provided by the Microsoft Corporation, receives application data in XPS data format, and then sends it to the printer after converting it into PDL format, or as it is, for printing.

Recently, the XPS driver has been developed and conducted research on, as a replacement of GDI driver. First, the XPS driver is explained as follows, while citing the following link which details the implementation method of XPS driver.

Print ticket and PrintCapabilities Support in Windows Printer drivers (Microsoft Corporation, 2006)
http://www.microsoft.com/whdc/device/print/XPSDrv_Print Ticket.mspx Application data (XPS) include not only the data related to documents and figures, but it also include the XML data which is called a print ticket related to the print setting; a print filter of the XPS driver generates the PDL according to the print ticket. Further, when inserting a print ticket into XPS, using the interface provided by the Configuration Module of preliminary XPS driver validation process is conducted.

Here, the validation process refers to the process of changing a print ticket with inconsistencies between the functions according its print setting into a print ticket without inconsistencies by eliminating the inconsistencies between the functions. As an example, even when a printer is comprised with a duplex printing (that is, printing on the both sides of a paper) function, when envelop size is set as the printing size, there are cases duplex printing cannot be executed.

In such a case, when the received print ticket for validation process has been assigned to duplex printing and page size is selected to envelop size simultaneously, the Configuration Module of XPS driver changes the configuration to simplex printing (that is, printing on a single side of a paper) and returns the data to the application.

In case XPS including a invalid print ticket, which is inputted from the application, the filter of the XPS driver is able to generate a consistence PDL as the result.

However, whether an application call the validation process is depends on the program construction, in real world printing situation it is not guaranteed that that an invalid print ticket is always inputted to the XPS driver. As an example, there may be unorthodox applications that write in the print ticket which has already been undergone the validation process, and input it directly to the XPS driver.

Further, one aspect of XPS is being a general document format such as PDF (registered trademark); therefore XPS may include print ticket which is not compatible with the subjected printer, and being outputted by the application as it is to the printer may also occur.

In case PDL is generated using such a print ticket, the printer may conduct incorrect operations. Therefore, in reality, preliminarily filter has to call the validation process and change the print ticket in to a consistence state, and then create the PDL.

Moreover, Japanese Patent Laid-Open No. 2003-296063 discloses an invention of a system that conducts printing on a printer connected to the web server, according to the requests of Web clients, with a method to reduce the server access number and realize high-speed print setting when validation process is conducted.

However, in recent years print ticket of XPS drivers with support to multiple printers and digital multifunctional peripherals, the function description that should be written in is high, and proportional to the description size the inter-function conflicts and their complexity rises; therefore, the validation process time is increased.

The point that print ticket is written in XML is the main cause which consumes time within the validation process.

Similarly in conventional GDI driver the validation process is conducted; however in GDI driver print setting description is written in binary data format which is called DEV MODE, therefore the processing speed does not become a problem.

However, when print ticket is in XML text format the process consumes more time; therefore, the reduction of the performance time caused by it cannot be ignored.

Further, the number of filters used for processing the printing of XPS driver is not limited to one, it may be a plurality of filters attached in hybrid format; as the number of filters increases delay due to validation process becomes noticeable.

Moreover, the invention of Japanese Patent Laid-Open No. 2003-296063, in system consist of Web server and clients, the server access number is reduced when validation process is conducted, here, alternative "conflict control information" is been used.

However, these "conflict control information" does not have the capacity to dissolute inconsistencies of the whole print setting, further, XPS driver primarily does not have a mechanism to receive print setting information expect for print ticket.

SUMMARY OF THE INVENTION

The present invention has been made with the objective of conducting inconsistency dissolution of functions included in print setting only when such a process is necessary and thereby improving the performance of the printing process.

According to one aspect of the present invention, there is provided an information processing apparatus for generating print setting data including a plurality of print setting information, comprising: a setting unit that sets, to the print setting data, processed information indicating that a validation process has been executed such that print setting information which cannot coexist is not included in the print setting data; and a generation control unit that generates print data without by performing the validation process after an application outputs application data and print setting data in a case where it is determined that the print setting data to which the processed information is set is added to the application data output from the application and the print setting data is not changed based on the processed information, or generates print data performing the validation process after the application outputs application data and print setting data in a case where it is determined that the processed information is not added to the print setting data or the print setting data is changed based on the processed information.

Further features of the present invention will become apparent from the following description of exemplary embodiments (with reference to the attached drawings).

BRIEF DESCRIPTION OF THE DRAWINGS

FIG. 5 is a figure showing a case where an application is sending a print ticket to printer driver;

FIG. 8 is a figure showing an exemplarily print ticket which is been granted with an electronic signature;

FIGS. 9A and 9B are a flowchart showing the process flow of the host computer according to the second embodiment;

FIG. 10 is a figure showing an exemplarily print ticket according to the second embodiment;

FIG. 11 is a figure showing a conceptual diagram for explaining grouping of the functions according to the third embodiment;

FIG. 14 is a figure showing an exemplarily print ticket used according to the third embodiment.

DESCRIPTION OF THE EMBODIMENTS

The preferred embodiments of the present invention will be described in detail below with reference to the accompanying drawings.

[Print System Construction]

Figure 1:
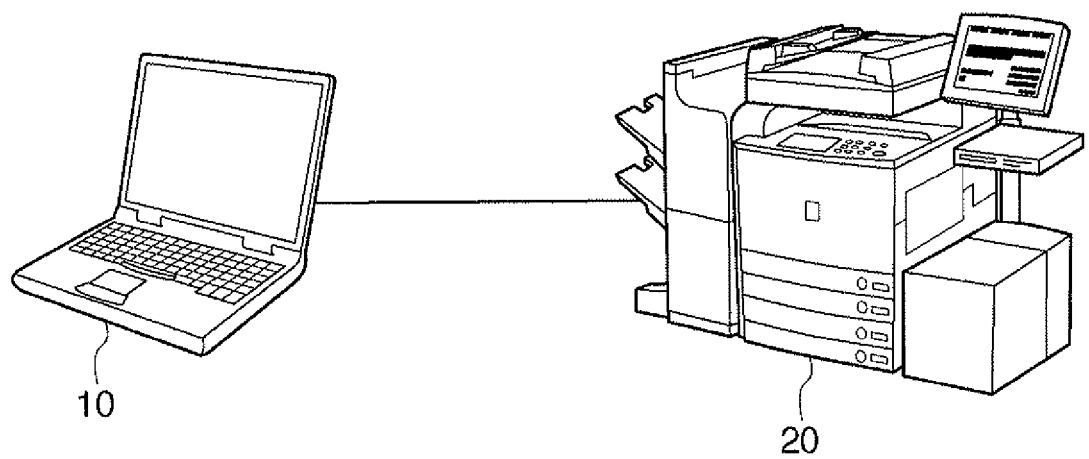
FIG. 1 is a figure showing exemplarily printing system construction according to the present invention.

FIG. 1 is a figure showing exemplarily printing system construction according to the present invention. In FIG. 1, 10 is an information processing apparatus which is a host computer used by the user for assigning printing. 20 is a printer, in this case a digital multifunctional peripheral is been shown; however, the present invention is not limited to digital multifunctional peripherals. The host computer 10 and the printer 20 are connected through network such as Centronics interface and LAN (Local Area Networks).

[Host Computer Construction]

Figure 2:
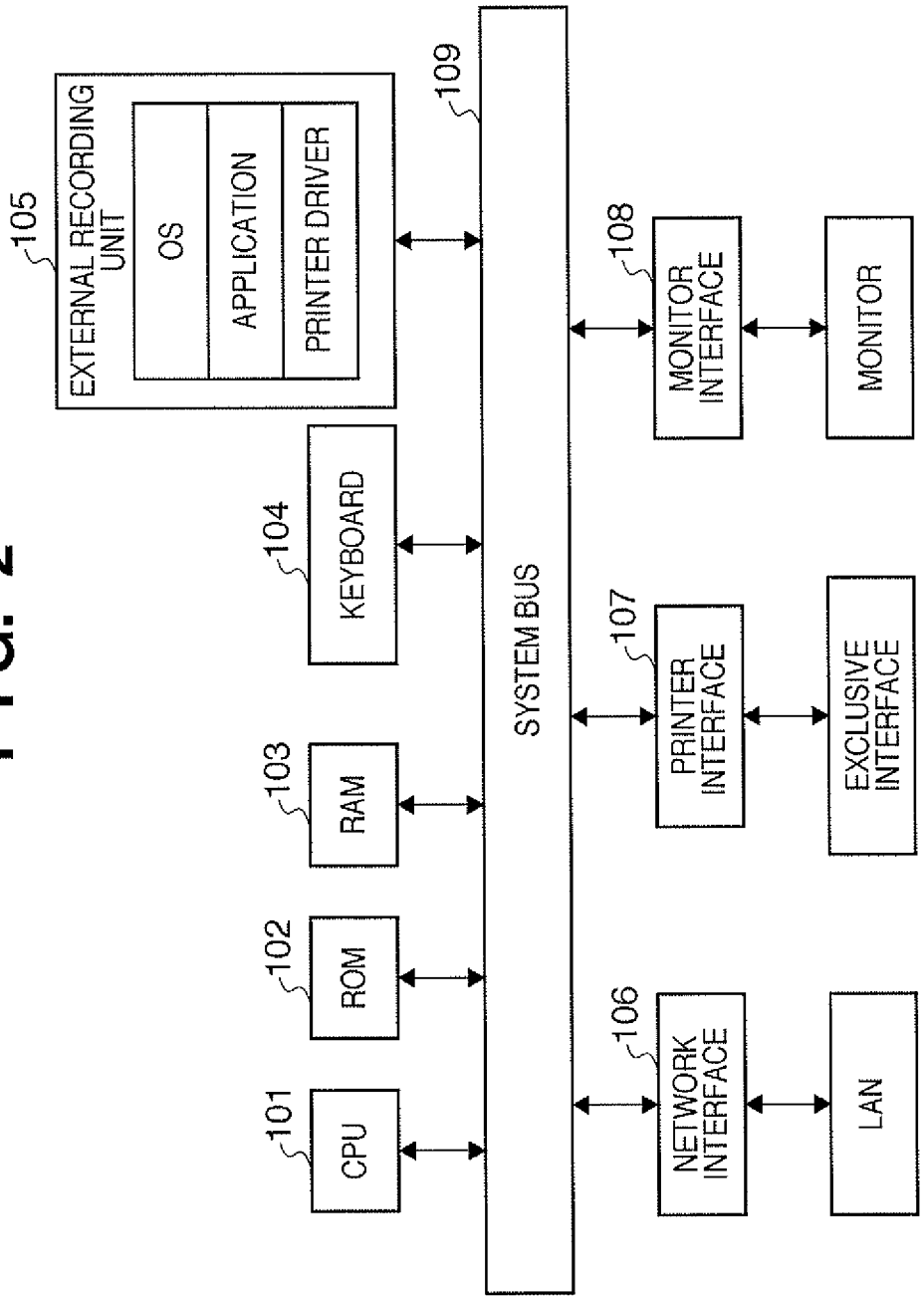
FIG. 2 is a block diagram showing exemplarily construction of a host computer 10.

FIG. 2 is a block diagram showing exemplarily construction of a host computer 10 of FIG. 1. The CPU 101 control the host computer 10 by executing a program stored in a ROM 102, a ROM 103 or in an external recording unit 105. The RAM 103 is used as a working area by the CPU 101 when executing various processes. The external recording unit 105 stores the Operating System (OS), the application software and the printer driver software.

A Keyboard 104 and input devices such as mouse which is not represented in the picture are the devices for providing various instructions by the user. The Network Interface 106 and the Printer Interface 107 are data receiving interfaces connected through LAN or dedicated interfaces to the printer 20.

The Monitor Interface 108 is, by connecting to the Monitor, an interface to control display data transferring. Then, the system bus 109 is a bus which is connected to each unit of the host computer 10.

[Detailed System Construction for Printing Control]

Figure 3:
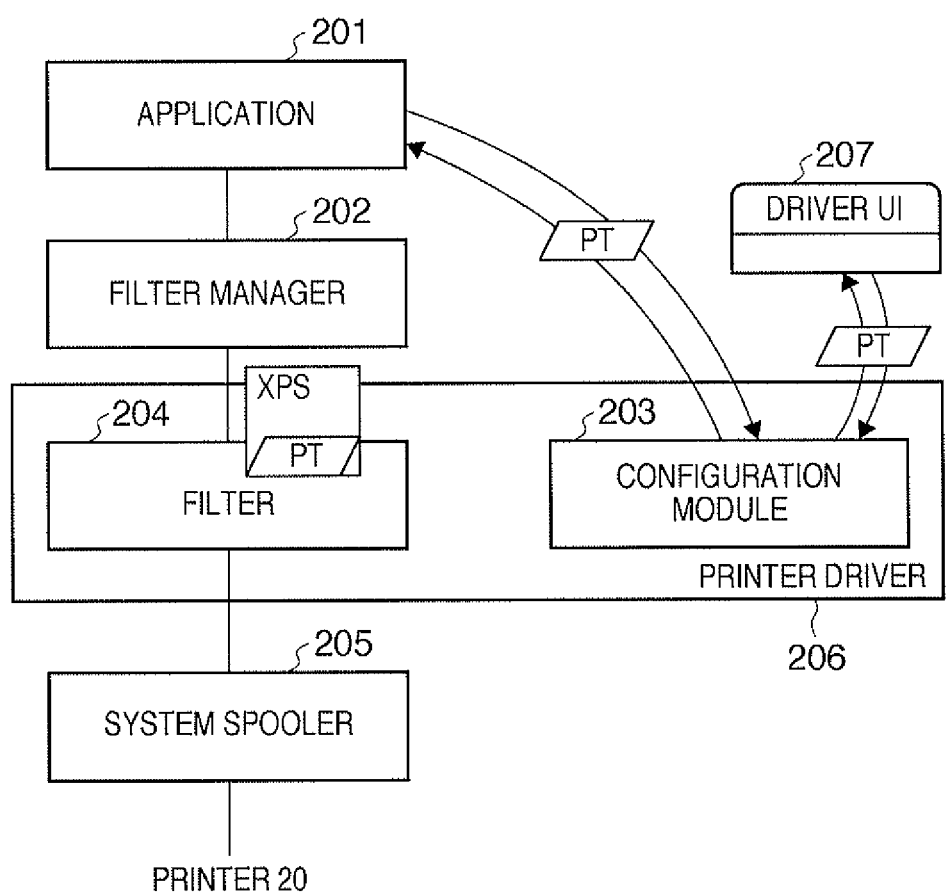
FIG. 3 is a block diagram showing the system construction necessary for printing in host computer 10.

FIG. 3 is a block diagram showing the system construction necessary for conducting printing control in the host computer 10. Here, by refereeing to examples of the construction of Operating System of Microsoft Inc. and construction of XPS driver the explanation will be conducted.

An Application 201, a Filter Manager 202, a Configuration Module 203, a Filter 204 and a System Spooler 205 are recorded in the External Recording Unit 105 as files. These files are loaded in to the RAM 103, and executed by the CPU 101.

The Configuration Module 203 and the Filter 204 generate print data outputted to the printer 20 or act as a program providing print setting information utilizing the aforementioned print data; and altogether these are called the Printer Driver 206. The Application 201 and the Printer Driver 206, can be added to the External Recording Unit 105 using such as floppy drivers and unrepresented CD-ROMs or be added to the External Recording Unit 105 by connecting to the External Recording Unit 105 via the Network Interface 106.

Here, when the Application 201 instructs data printing to the Printer 20, the data to be printed is also transformed to XPS data format. Then, transformed XPS is outputted to the Filter Manager 202 through an API. This XPS is constructed with parts that can be roughly separated into: the print content description part and the print setting description part.

The filter 204 of the Printer Driver 206 generates PDL according to the print content description of XPS, and sends it to the Printer 20 via the System Spooler 205 of the OS. Then, the Printer 20 conducts printing based on this PDL.

Among XPS, the print setting description is been called a Print ticket (PT), and written in an independent format compared to XPS. The Print ticket is been written in XML and the details of the Print ticket will be discussed later. Therefore, print setting information and Print ticket have the same definition. Moreover, the Print ticket includes configuration parameters such as number of copies, paper size, and etc.

The Application 201, based on the assignment of the User or the Application, writes print setting contents in to the print ticket, and then sends the print ticket embedded in to XPS, to provide Printer 20 instructs such as outputting multiple copies and duplex printing.

Moreover, the Application 201 can extract the print ticket in the Printer Driver 206 through an API of the Configuration Module 203. In the extracted print ticket from the Configuration Module 203 the default print setting is been preliminarily written by the Printer Driver 206.

Here, in case print setting needed to be changed into a non-default value, user update can be received through a Driver UI 207 of the Configuration Module 203. The Driver UI 207 is a user interface that controls the Configuration Module 203; represented by calling from the Application 201 to Configuration Module 203 through an API.

Then, the print setting update conducted on the Driver UI 207 is transferred to the print ticket, and it is returned to the Application 201 through the API. Therefore, the Application 201 is able to, by embedding the returned print ticket into XPS, print according to user preferred print setting.

Here, both the default print ticket and the print ticket changed through driver IU 207 are the data generated or changed by the Configuration Module 203, the inconsistency in configuration has been resolved.

Therefore, the print ticket inputted to the Filter 204 does not contain inconsistency in configuration; therefore, the Filter 204 can generate PDL without inconsistencies.

[The Case where Inconsistencies are Included in the Print Setting]

However, there are cases where the inputted print ticket to the Filter 204 contains inconsistencies in setting. As an example, the XML format of the print ticket is a publically known format, even without receiving through the API of the Printer Driver 206, the Application 201 itself is able to write the print setting information and embed it into XPS and output XPS to the Filter 204.

Figure 4:
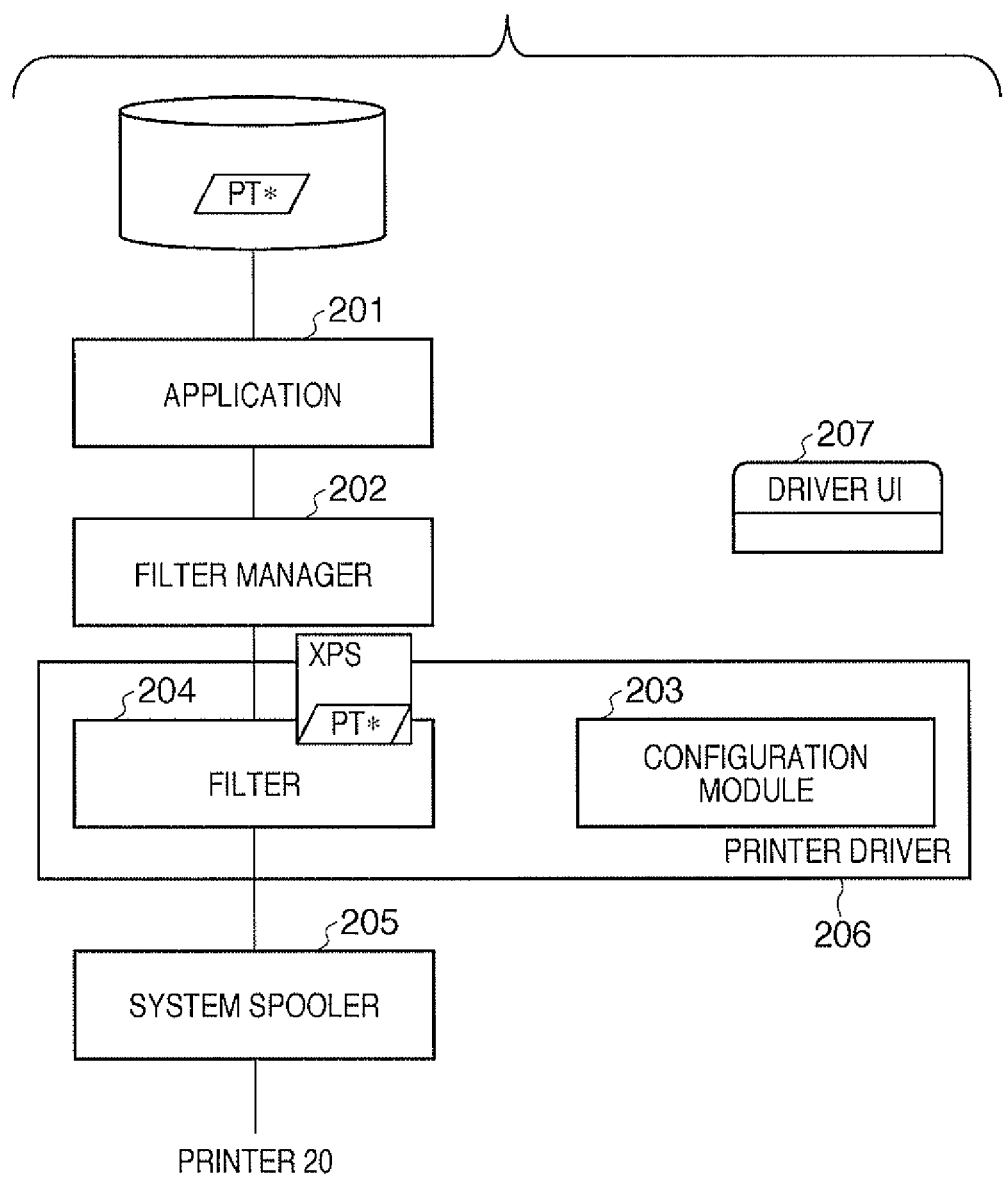
FIG. 4 is a figure showing a case where an application itself is sending a print ticket to printer driver.

FIG. 4 is a figure showing a case where an application is sending a print ticket to printer driver, where the print ticket has the print setting information written according to application's wishes. In this case, the Application 201, without going through the Configuration Module 203, has generated the print ticket by itself; therefore, it might contain inconsistencies in the settings of the print ticket. This is due to the fact that the validation process of the Configuration Module 203 which is for resolving inconsistencies in settings is not applied to this print ticket.

As a result, when this type of print ticket is embedded XPS is inputted to the Filter 204, PDL with inconsistencies may be generated and send it to the printer 20; therefore the printer 20 may conduct incorrect operations.

Moreover, as another example, after the Application 201 receives the print ticket through Driver UI 207, to apply the Application 201 preferred print setting, it can rewrite the print ticket.

FIG. 5 is a figure showing a case of an application, after receiving the print ticket from the driver UI rewriting the print ticket and then sending the print ticket to printer driver by embedding it to XPS. Even in this case, at the point the print ticket is rewritten by the Application 201, there is a possibility of inconsistencies of the setting; therefore, the printer 20 may conduct incorrect operations.

Here, the Filter 204 assumes the received print ticket within the XPS may have an inconsistency, and conduct validation process using the API provided by the Configuration Module 203.

Here, the validation process is the process of outputting a print ticket, when print ticket written with preferred print setting information is inputted, after resolving setting inconsistencies. This validation process is conducted inside of the Configuration Module 203.

The Configuration Module 203 records information regarding how to change the setting in case setting of pairs and lists which is impossible with each other is generated. As an example, consider that the printer 20 is unable to conduct duplex printing in case the paper size is set to "postcard". In this case, the Configuration Module 203 has recorded the information that indicates postcard size paper and duplex printing is not compatible; further, in case this pair is occurred changing the duplex printing in to simplex printing is also recorded.

More specifically, the Filter 206 resolves inconsistencies of the setting that may included in the received print ticket, by calling the validation process, as a result it may generate PDL without inconsistencies.

However, as described above, consumption of long period of time for the validation process is a problem.

In recent years, for the most part, the print ticket description should be able to represent functions of the multifunction printers and the digital multifunctional peripheral which are rich in functionality; therefore, the number of conflicts and the complexity of the print ticket increases proportionally, resulting an increase of the validation process time in such a system.

Moreover, print ticket is written in XML, which is also reason for requiring long time period for processing.

As a result, the time period of the validation process within the time period of the total process become larger; as a result, printing efficiency decreases.

First Embodiment

Here, in the first embodiment, the printing process performance is improved by optimizing the validation process of the Filter 204.

Figure 6:
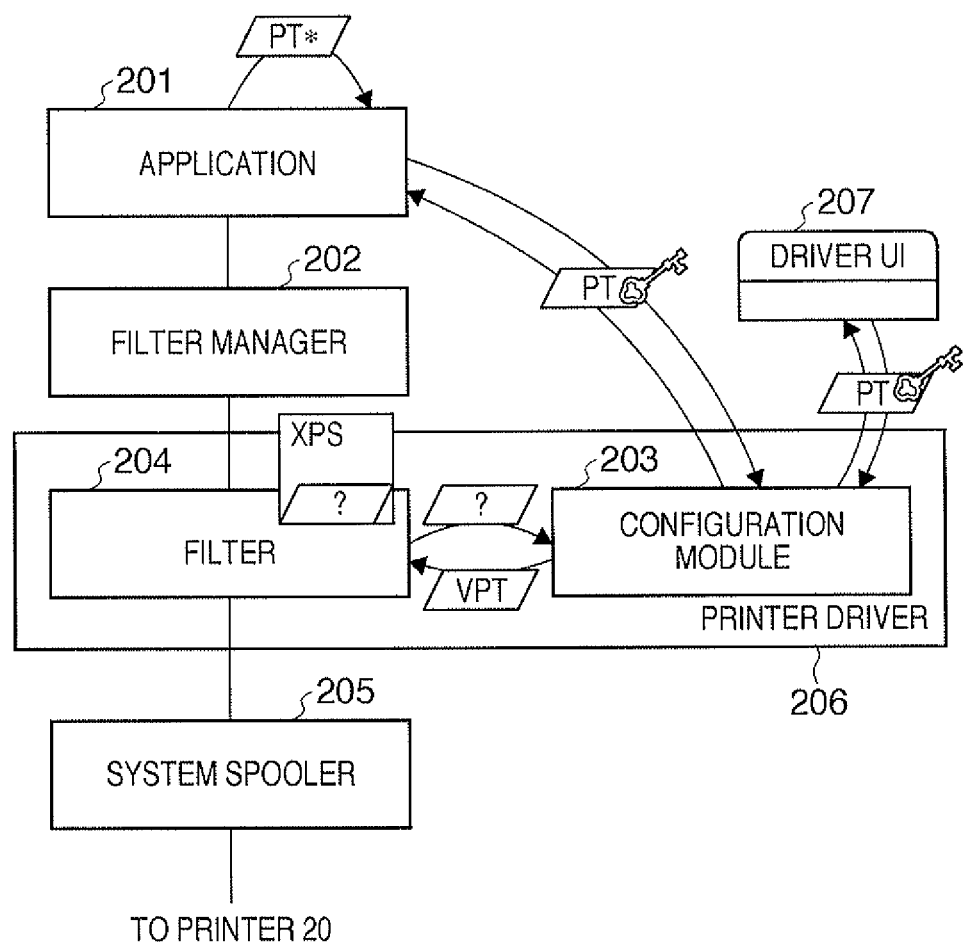
FIG. 6 is a block figure showing an exemplarily system construction for optimized printing according to the first embodiment.

FIG. 6 is a block figure showing an exemplarily system construction for optimized printing according to the first embodiment. First, the Configuration Module 203 transform the default print ticket etc. at the Driver UI 207, then returning the print ticket without inconsistencies to the Application 201, while attaching a XML electronic signature to the print ticket.

Then, if the Filter 204 received a print ticket that includes an electronic signature and the electronic signature has not been changed, the validation process is skipped and PDL is directly generated.

Thereby, the time for validation process of print ticket without inconsistencies can be saved, due to this efficient print processing becomes possible.

Figure 7:
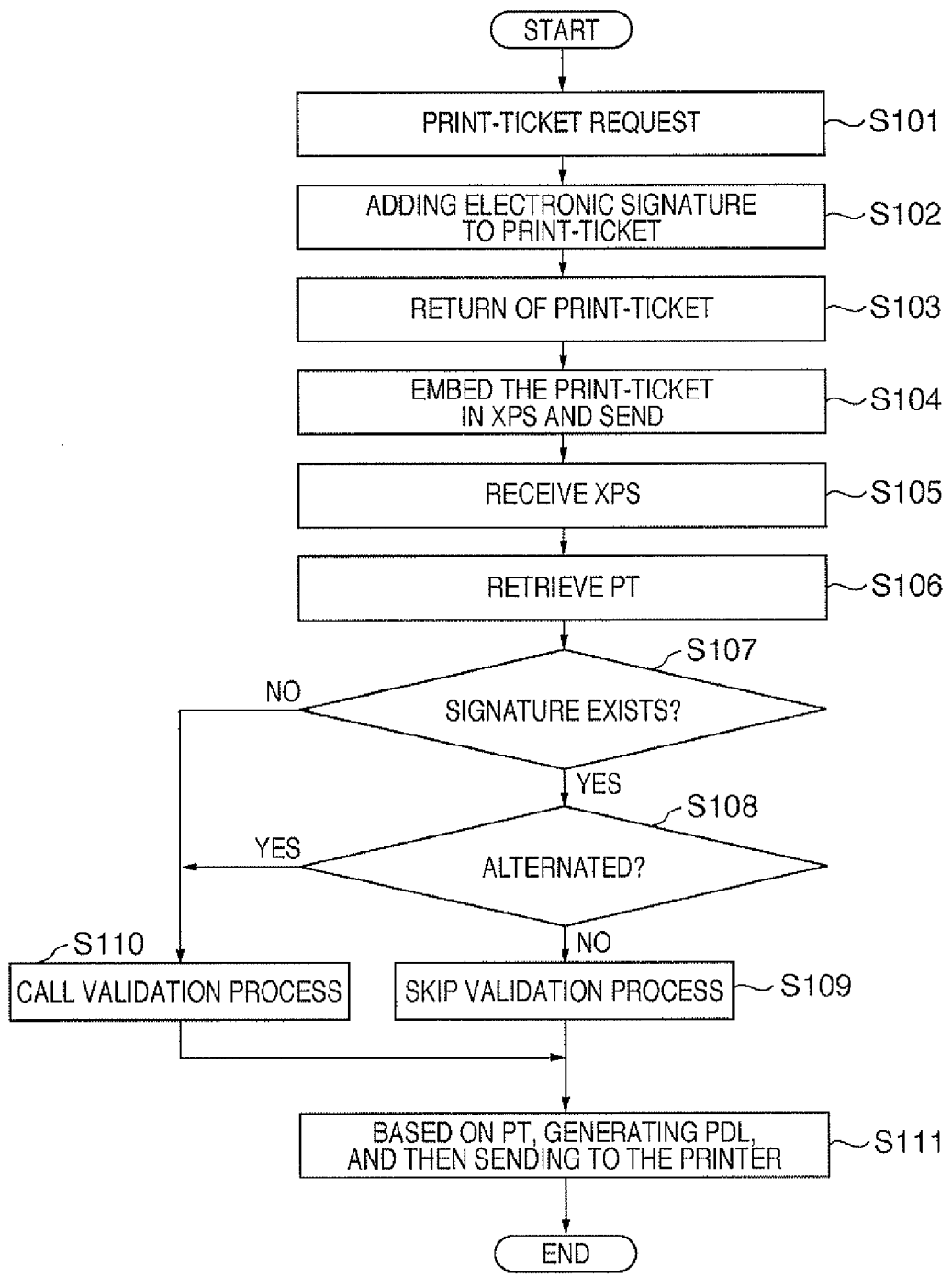
FIG. 7 is a flowchart showing the process flow of the host computer according to the first embodiment.

Here, the Printer Driver 206 is been executed by the Filter 204, and the validation process calling optimization is explained using the FIG. 7. Each step of the flow chart is implemented by reading out the related programs form the memory and executing each of these by the CPU.

FIG. 7 is a flowchart showing the process flow of the host computer according to the first embodiment. First, in step S101, the Application 201 requests the print ticket from the Configuration Module 203. In this moment, the requested print ticket can be a print ticket that has preliminarily saved in the Configuration Module 203, or it can be an obtainable print ticket that has changed through the Driver UI 207.

Next, in step S102, the Configuration Module 203 grants the electronic signature to the print ticket. In the first embodiment, as a technology to embed electronic signature to the XML data, here, W3C defined standard technology of RFC3075 is been used.

FIG. 8 is a figure showing an exemplarily print ticket which is been granted with an electronic signature. The print ticket is written as a structure that has a root element <Print ticket/> and a plurality of sub elements <Feature/>~<Option/> within this root element. In <Feature/>, function names such as PageMediaSize (page size) is written; In <Option/>, selected number of Letter and like is written to represent the print setting. <Signature/> element that represented below <Feature/>~<Option/> is the part used for representing XML electronic signature information.

The Configuration Module 203, reads out the signature subjected continuous information of <Feature/>~<Option/> as a string, and inputs it in to a hash algorithm to obtain the signature value. This hash algorithm uses general methods such as SHA-1.

The received signature is encoded in to string such as [90dfj . . . ], and it is saved within the print ticket as the value of element <DigestValue/>. The signature is provided to the print ticket in the above manner. Next, in step S103, the Configuration Module 203 returns the signed print ticket to the Application 201.

Hereby, in step S104, the Application 201 embeds print ticket inside the generated XPS, and sends it to the Filter 204 of the Printer Driver 206 through the Filter Manger 202.

Here, the Application 201 may send the returned print ticket of step S103 as it is, or as represented in FIG. 4 and FIG. 5 it may send a preliminarily prepared print ticket or a print ticket changed by writing in.

In any case, as later described in steps S107-S108, processes according to the print ticket contents is conducted.

Next, in step S105, the Filter 204 receives XPS. Then, in step S106, the Filter 204 retrieves the print ticket embedded in XPS.

Next, step S107, the Filter 204 checks whether print ticket includes an electronic signature or not. Specifically, the Filter 204 checks where there is a <Signature/> element or not.

Here, if the Application 201 has sent the print ticket received from the Configuration Module 203 as it is, a signature exists; on the other hand, in case preliminarily prepared print ticket is been inputted a signature does not exist. According to the check results, if there is a signature process the process proceeds to the step S108, if signature does not exist then the process proceeds to the step S110.

Step S108, the Filter 204 checks whether the print ticket is been changed or not by using the signature. The detection of changes based on the signature is almost equal to the signature procedure, first based on the multiple <Feature/>~<Option/> part that subjected to the signature the value of signature is calculated, then evaluate whether the calculated value matches with the signature value embedded in the XML or not. Further, as an example, the Filter 204 may receive the XML electronic signature given to the print ticket from the Filter 204, then by comparing this received XML electronic signature and receive print ticket signature, it is possible to execute the process of step S108.

Here, In case signature values match it represents the print ticket has not been changed, if signature values do not match, it represents that print ticket has been changed by the Application 201. In other words, if the print ticket has not been changed, the process proceeds to the step S109; if the print ticket has been changed the process proceeds to the step S110.

In step S109, the Filter 204 skips the validation process and proceeds to step S111. Which to say, when it is known that the print ticket has an electronic signature and also it has not changed, it is assured that print setting does not have inconsistencies; therefore, the Filter 204 can proceed to the next step while skipping the time consuming validation process.

On the other hand, in case electronic signature does not exists or the print ticket has been changed, in step S110, the Filter 204 calls for validation process from the Configuration Module 203, and conduct the validation process to resolve the conflicts. Here, in case step S110 is executed it takes longer time; therefore the total print process becomes longer.

Finally, in step S111, the Filter 204, based on the print ticket contents, creates the PDL, then through the System Spooler 205 of the OS, sends it to the printer 20 and assigns print outputting of the printer.

According to the first embodiment, since the unnecessary calling of the configuration module gets abbreviated the process efficiency is been improved.

Further, the filter detects whether validation process conducted print ticket has been changed at the application or not, if it has not been changed the printing process can be conducted without calling the time consuming validation process. Thereby, printing performance is been improved and user can obtain the printed material relatively quickly.

Second Embodiment

Next, the second embodiment will be explained while referring to the figures. In the first embodiment, an electronic signature is granted to the print ticket as a whole; in the second embodiment only the part that generates the inconsistency is granted a digital signature.

In other words, in the print setting written in the print ticket, there is a part that get influenced by the changes conducted by the application, and a part that does not get influenced by the changes conducted by the application. In the first embodiment, the digital signature is given to the print ticket without considering the differences in these parts; therefore, compared to a filter that only refers to the part that get influenced, due to unnecessary detections, the filter according to the first embodiment has a lower efficiency.

Moreover, when signature is granted to the print ticket as a whole, there is a problem of increasing calculations of the signature value calculation.

Whereupon, in second embodiment, print ticket is separated in to influenced part and the non-influenced part due to changes conducted by the application, and by only granting the digital signature to the influenced part, relatively efficient print process is conducted.

The printing system, the host computer, and the printer driver architecture according to the second embodiment of the present invention is the same as the first embodiment; therefore, the explanation is abbreviated.

Figure 9B:
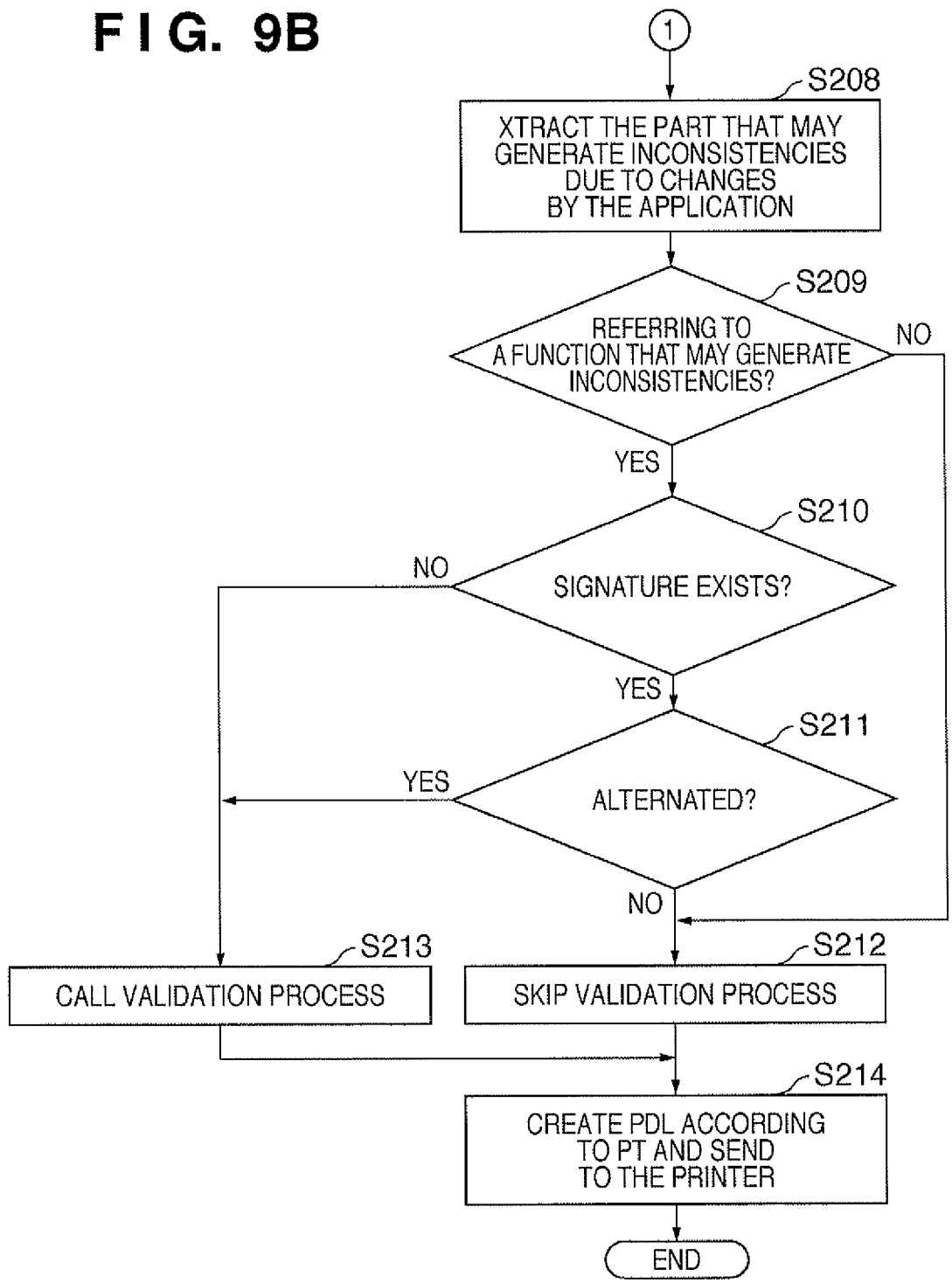

Here, the Printer Driver 206 is executed by the Filter 204, the validation process calling optimized process is explained using the FIGS. 9A and 9B.

FIGS. 9A and 9B are a flowchart showing the process flow of the host computer according to the second embodiment. First, in step S201, the Application 201 requests print ticket from the Configuration Module 203. Next, in step S202, the Configuration Module 203 separate the print ticket in to the part that may generate inconsistencies by the changes conducted by the Application 201 and the part that does not generate inconsistencies by the changes conducted by the Application 201.

FIG. 10 is a figure showing an exemplarily print ticket according to the second embodiment. Among the functions that configured by the Print ticket there are two types; the function that might generate an inconsistency; and the function that will not generate an inconsistency due to the changes of the print ticket conducted by an application.

As the first type, the "paper size", as the other type "number of copies" can be given. Because, in case of "paper size", there may be an inconsistency as mentioned above, depending on the contents of the duplex print setting. On the other hand, the setting of "number of copies" does not conflict with other function of the printer; therefore it can be configured without any inconsistencies.

Here, the print ticket is written in a format where the function that might generate inconsistencies with other functions and function that do not generate inconsistencies are separated in to two sets.

Next, in step S203, the Configuration Module 203 grants an electronic signature to the part that may generate inconsistencies due to changes conducted by the Application 201. Specifically, in the step S202, the separated function set that may generate inconsistencies with other functions is taken as a one string and by applying the hash function calculates the value of the signature.

The value of the signature is saved as the value of element <Digest Value/> within the print ticket. Here, the element <Signature/> is written after the description of the function set that may generate inconsistencies with other functions. According to the above procedures the partially signed print ticket is received.

Next, in step S204, the Configuration Module 203 returns the partially signed print ticket obtained in the step S203 to the Application 201.

Thereby, in step S205, the Application 201 inserts the generated print ticket inside XPS, and sends it through the Filter Manger 202 to the Filter 204 of the Printer Driver 206.

Next, in step S206, the Filter 204 receives XPS. Then, in step S207, the Filter 204 extracts the print ticket embedded inside XPS.

Next, in step S208, the Filter 204 extracts the part that may generate inconsistencies due to changes by the Application 201. Inside the print ticket the part that comes before <signature> is extracted using a position of the signature by the Filter 204, due to the fact the part comes before the signature is the part that may generate inconsistencies due to changes.

Then, in step S209, the Filter 204 determines whether or not it refers to the part that contains inconsistencies or not, to generate PDL. Specifically, if all the necessary configuration parameters needed for generating PDL, is different from the part extracted in step S208, is included in the part that does not generate inconsistencies, it is not necessary to call the validation process. Thus, the process is proceeds to the step S212. In case the condition is not true, the process proceeds to step S210.

Next, in step S210, the Filter 204 detects whether the print ticket contain a XML signature within the print ticket or not. The other steps S211-S214, that follow have the same processes as the steps of S108-S111 of the first embodiment; therefore, the explanations of these steps are abbreviated.

According to the second embodiment, by separating the print ticket in to the part that may be influenced by the changes conducted by the application, and the part that does not get influenced by the changes conducted by the application, and then by embedding a signature to the part that may be influenced, it is possible to conduct relatively high efficient processing.

Specifically, in case filter is referring to the print setting part that does not get influenced by changes conducted by the application, change detection process can be abbreviated; therefore, relatively speedy printing process become possible.

Moreover, the part that subjected to the signature within the print ticket is reduced; as a result signature value calculation is reduced and speed is increased; therefore, even in case filter is referring to the part that may be influenced by the changes by the application the process is speeded up.

Third Embodiment

Next, while refereeing to the figures a third embodiment according to the present invention will be explained. In the first embodiment and the second embodiment, one filter of printer driver is conducted the processes of the print ticket inside the XPS; in the third embodiment, combination of a plurality of filters conducting the print ticket process by each filter is considered. Moreover, here, in a print ticket that has grouped the functions that may generate inconsistencies, giving a signature to each group is considered.

FIG. 11 is a figure showing a conceptual diagram for explaining grouping of the functions according to the third embodiment. The Configuration Module 203, recorded configuration incompatible function pairs and lists for a multi-function device goes up to few hundred; however, these pairs and lists can be merge into few groups.

As an example, based on the setting of "paper size" and "staple" inconsistencies may occur; therefore, these two functions generates a setting incompatible pair. Moreover, "staple" and "paper type"; and "paper type" and "paper feeding step" also generate pairs.

By merging these pairs, it is possible to define a group of functions that may generate inconsistencies due to each other.

Moreover, "color matching", "color correction", and "black and white printing" are also defined into another group; and also, "Nup", "Poster Print", and etc. are also another group.

Thereby, conducting grouping iteratively, the Configuration Module 203 can group all the managed functions into few groups.

Here, for the ease of explanation, it is considered that all the functions are separated in to three groups A, B and C. The characteristic of these groups, as obvious from the explanation, the functions of different groups do not generate inconsistencies. In other words, when inconsistencies are considered the groups can be considered as mutually independent groups.

Figure 12:
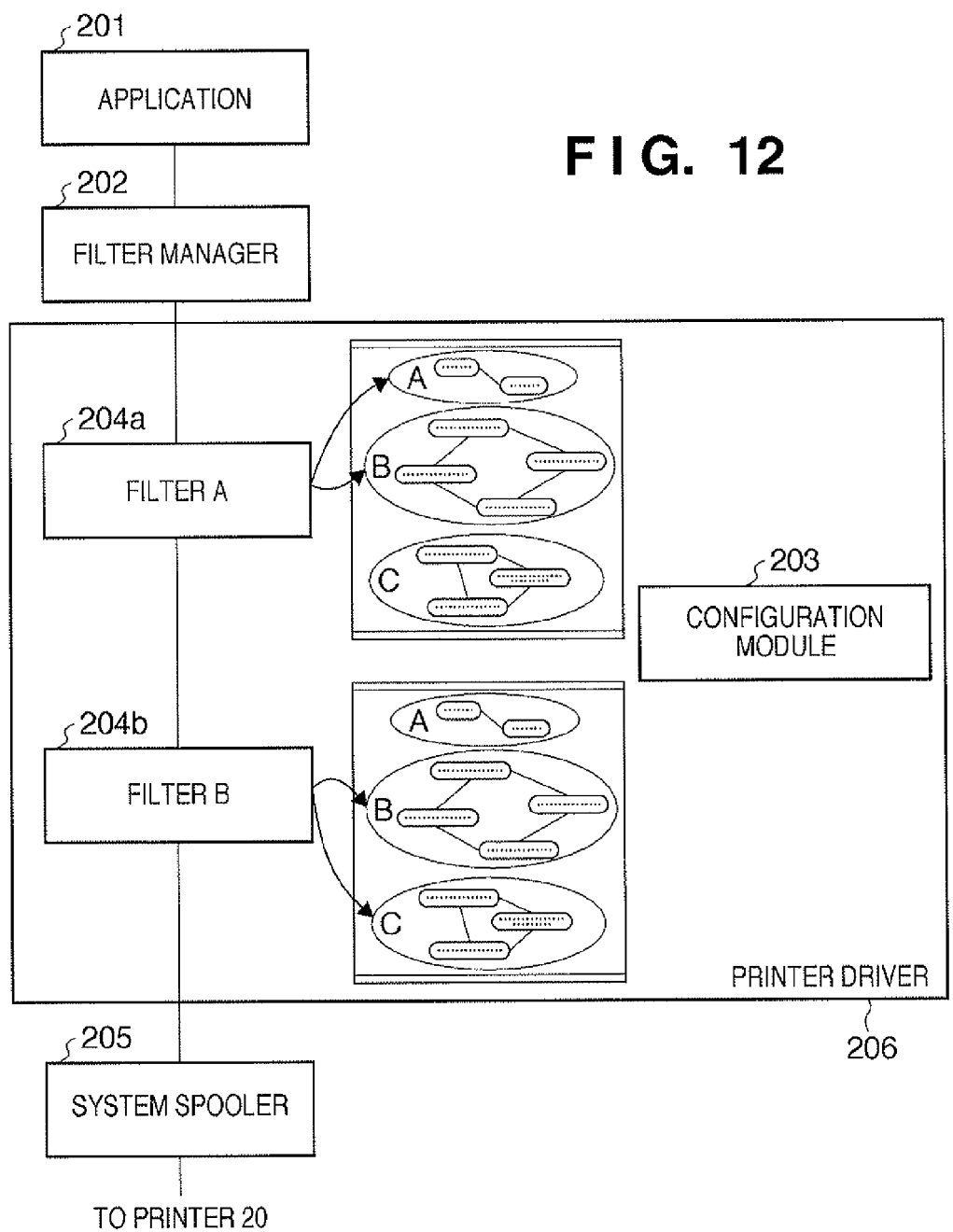
FIG. 12 is a figure showing an exemplarily printing system construction according to the third embodiment.

FIG. 12 is a figure showing an exemplarily printing system construction according to the third embodiment. The difference of the FIG. 12 compared to FIG. 6 is that FIG. 15 has Filters 204a and 204b instead of the Filter 204 of FIG. 6. The XPS driver is able to separate the printing process based on the role and the phase of the printing process and then combine these to form a pipeline. Here, in this example the filter having only two filter parts 204a, 204b is been considered; however, the filter is not limited to two.

Here, the Filter 204a is the module that conducts printer layout related operations such as Nup and poster. And the Filter 204b is the module that conducts color setting, rendering, generating PDL and etc.

The XPS sent through the Filter Manager 202, which first received by the Filter 204a where the Filter 204a process is conducted and then the processed XPS is sent to the next the Filter 204b. The Filter 204b process the XPS which is first processed by the Filter 204a; after that, the XPS is converted into PDL and sent to the printer 20.

Here, the print ticket is embedded inside the XPS, the Filter 204a and the Filter 204b refers to it one after the other when each one of these conducting the process.

Moreover, the Filter 204a and the Filter 204b is not referring to all the setting information that is written in the print ticket. The referred setting information of the print ticket is depend on the role of the Filter; however, when there is a construction of multiple pipeline filters, the print ticket contain large portion of description that is not necessary to the filter itself.

As an example, layout process the Filter 204a refer to the function such as "paper size" and "Nup", but it does not refer to the function such as "black and white print" and "color matching". On the other hand, the Filter 204b which conducts the rendering process does refer to the function such as "paper size", "stapler" and "color matching" and it does not refer to the functions such as "paper size" and "Nup".

In this manner, when looked into the groups that has been referred and not referred; the fact that the Filter 204a has only referred to group A and group B; and the Filter 204b has only referred to group B and group C are clear.

Here, the third embodiment focuses on the fact that each filter refers to only functions of not the whole print ticket but few groups.

Figure 13A:
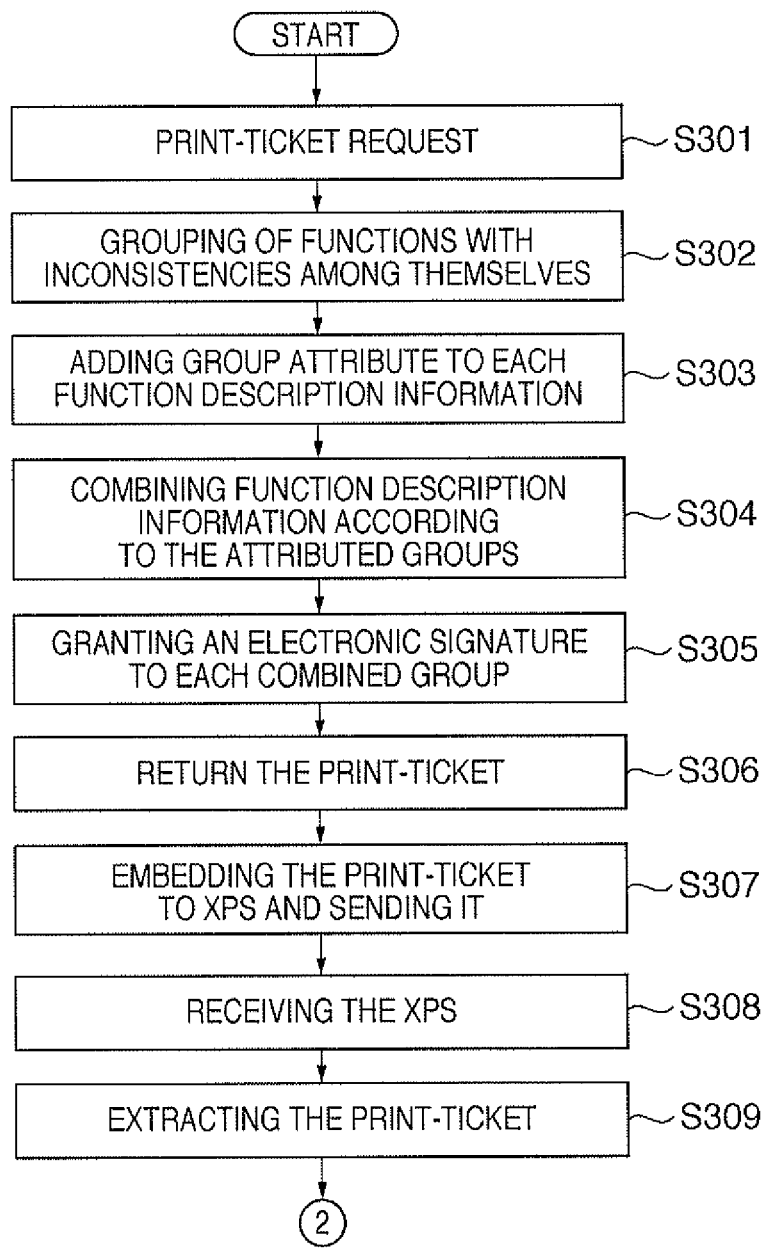
FIGS. 13A to 13C are a flowchart showing the process flow of the host computer according to the third embodiment.
Figure 13B:
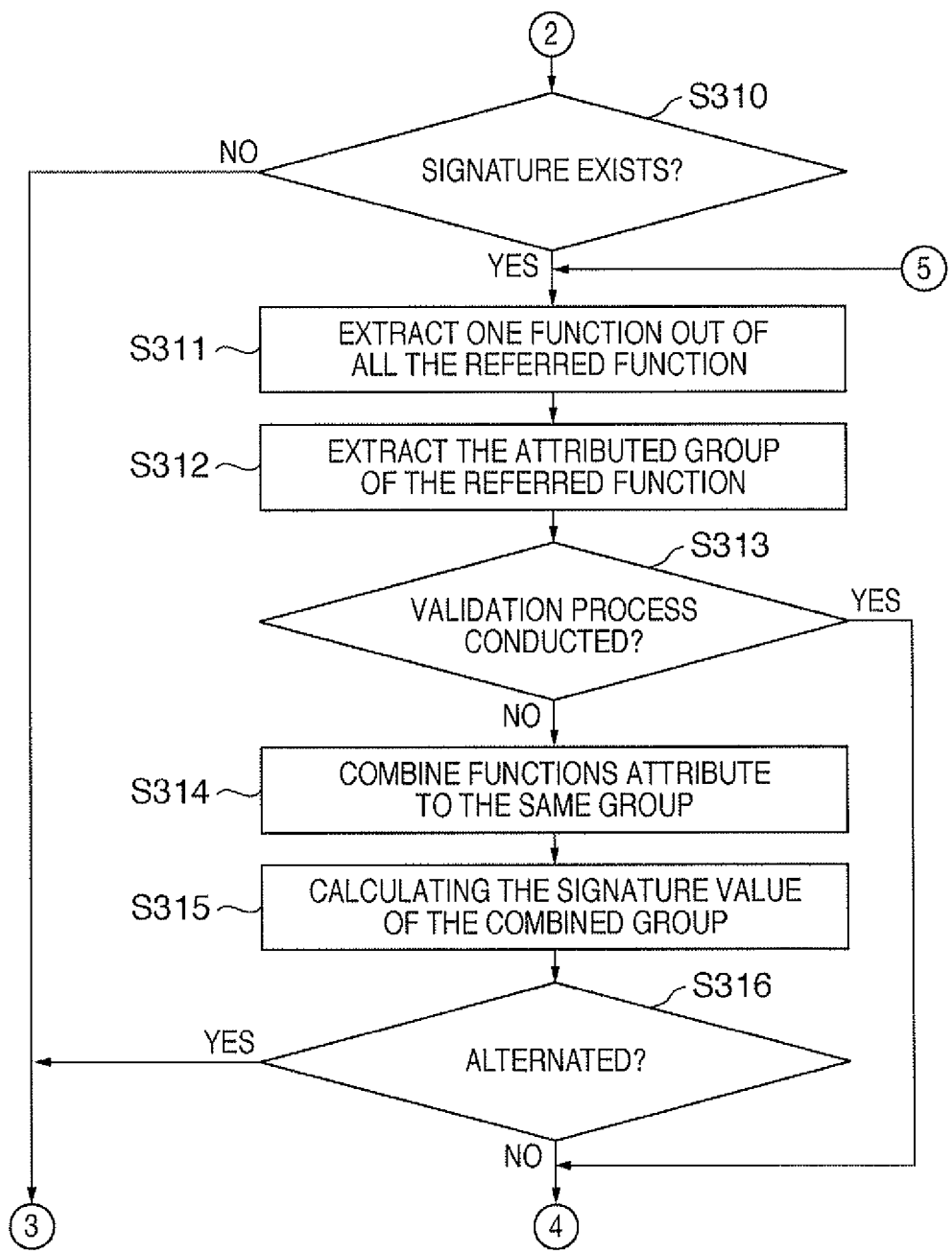
Figure 13C:
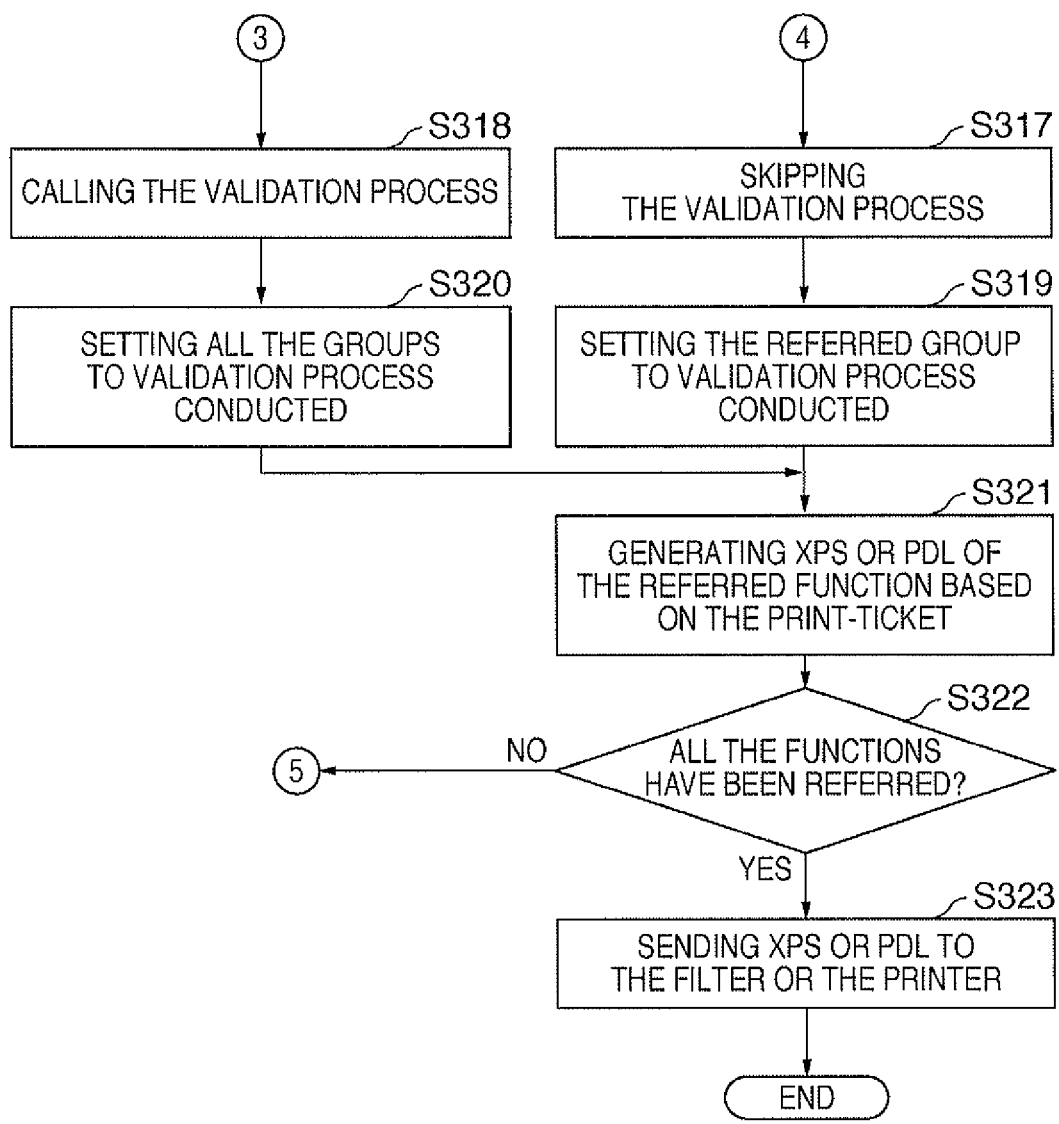

FIGS. 13A to 13C are a flowchart showing the process flow of the host computer according to the third embodiment. Initially, in step S301, the Application 201 requests print ticket from the Configuration Module 203. Next, in step S302, the Configuration Module 203, functions that may have inconsistencies with each other is grouped. This grouping is, as described in the FIG. 11, the Configuration Module 203 conducted by combining the pairs and list of the functions that may create incompatibilities in configuration with each other.

Next, in step S303, the Configuration Module 203 adds group association to written information of the each function. In other words, names such as A, B, C, . . . is given to the groups that created in the Step S302, moreover, these names are added to each function description of the print ticket as information.

FIG. 14 is a figure showing an exemplarily print ticket used according to the third embodiment. Here, 1401 represent the print ticket where in <Feature/> element that represents each function of the group is written as group=a.

Next, in step S304, the Configuration Module 203 combines description information for each attributed group. This group combination is represented in the 1402 of FIG. 14. Specifically, for each group <Feature/>~<Option/> element is extracted, then functions integrated to create a single string.

Next, in step S305, the Configuration Module 203 grants a signature to each combined information description groups. Here, as represented in 1402 of FIG. 14, the combined description information string of each group of step S304, is applied to hash algorithm and receives signature values such as [b/BCAAa . . . ].

Then, as represented in 1403 of FIG. 14, calculated signature of each group is written in the print ticket using the <Signature/> element so that the attribution to the each group is clear.

Next, in step S306, the Configuration Module 203 returns the signed print ticket to the Application 201.

Whereby, in step S307, the Application 201 embeds the received print ticket within generated XPS, via the Filter Manager 202 sent to the Filter 204a.

Next, in step S308, the Filter 204a receives this XPS. Then, in step S309, the Filter 204a extracts the print ticket, which is embedded in the XPS.

Next, in step S310, the Filter 204a detects whether the print ticket contain a XML signature within the print ticket or not. According to the check, if there is the signature the process proceeds to the step S311, in case the signature is not there the process proceeds to the step S318.

In this step S311, the filter 204a extracts one function among whole referring functions. Here, the whole referring function means all the function such as "Paper Size" and "Nup" that the Filter 204a refers to; extracting one function means selecting one function among them.

Next, in step S312, the Filter 204a extracts the group attributes of the referred functions. Specifically, <Feature/>~<Option/> elements of the selected functions in step S311 is detected, further, the group attribute is referred and extracted the group attribution.

Next, in step S313, the Filter 204a determines whether it is validation process conducted group or not. Here, the Filter 204a has a memory to record whether a group has conducted the validation process or not. Moreover, in the initial phase the memory is in the state of "all the groups have not conducted the validation process", later when steps S319 and S320 are conducted the memory is updated into the state "some of the groups have conducted the validation process".

In step S313, it is determined whether the group extracted at step S312 is already conducted the validation process or not. Here, if validation process is already conducted the process proceeds to the step S317, if not the process proceeds to the step S314.

In this step S314, the Filter 204a combines the function attributed to the same group. Then, if the extracted group in step S312 is group A for an example, the Filter 204a search for groups in <Feature/>~<Option/> element attribute to the same group, searched elements is combined as a single string.

Next, in step S315, the Filter 204a calculates signature value of the combined description information.

Next, in step S316, the Filter 204a checks whether print ticket has been changed or not using the signatures. Here, the signature values used for change detection are the signature value calculated in the step S315, and the corresponding signature of the preset group among the Configuration Module 203 assigned signatures for each group in step S310.

As the comparison result, if the signatures match with each other the print ticket has not been changed; if the signatures do not match with each other the print ticket has been changed. If not changed, the process proceeds to step S317; if changed the process proceeds to step S318.

In step S317, the Filter 204a skips the validation process and proceeds to step S319. In other words, in the third embodiment, each group has given a signature and if given a group has not been changed; it means inconsistencies have been resolved by the conflict module 203.

Next, in step S319, the Filter 204a set the referred group as validation process conducted. In other words, in the memory area that record whether validation process is conducted or not, the status of currently referred group is changed to "validation process conducted".

Thereby, by recursively conducting the steps below step S311, if it can detected that the referred function attributed group is validation process conducted, the process of the step S314 to S316 of signature value calculation, can be abbreviated.

On the other hand, in step S318, the Filter 204a calls the validation process of the Configuration Module 203 the inconsistencies of the whole print ticket is been resolved.

Next, in step S320, the Filter 204a sets status of all the groups as validation process conducted. In the step S320, which is the mirror opposite to the step S319, since the whole print ticket has conducted the validation process in above step S318, all the attributed groups, in other words, the memory area is updated to indicate that all the groups have conducted the validation process.

Next, in step S321, the Filter 204a generates the XPS data according to the contents of the print ticket. Since the third embodiment orderly check whether validation process is been conducted or not for each process, in this point only part of the XPS is been generated.

Next, in step S322, the Filter 204a determines whether all the functions have been referred or not. If all the functions have not been referred the process returns to the step S311, and recursively conduct the above described steps; if all the functions have been referred the process proceeds to the step S323.

Finally, in step S323, the Filter 204a is sent the generated XPS to the Filter 204b. The XPS received by the Filter 204b, similar to the Filter 204a, repeats the step S310 to step S323, and finally, creates PDL, not XPS, then send the PDL to the printer 20 through the System Spooler 205 of the OS.

In the third embodiment, from step S311 to step S322 whether the electronic signature of the filter referred function attributed groups has changed or not is been checked.

Thereby, even in case initially non-referred functions are been changed, the changing effect can be resolved for a particular filter and as a result high-speed processing has become possible. As an example, a case, in the print ticket returned by the Application 201, "Black and White Print" which is a function attributed to the group C is been changed by the Application 201, before sending to the Filter 204a is considered.

In this case, the Filter 204a does not refer to the function of group A and B, the detected updated results of each group, may not call the validation process, the effect of the "Black and White Print" setting change is resolved from the Filter 204a.

As above, by granting a signature to each group constructed by selecting the function with mutual setting incompatibility, the effects of the updates conducted by the application can be localized.

Here, the discussion is limited to the case of two filters, when number of filters increases, the grouping according to the function is become more effective.

According to the present invention, when there are inconsistencies to be resolved only the necessary process is conducted; thereby, the present invention can improve the performance of the printing process.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287178, filed Nov. 7, 2008, which is hereby incorporated by reference herein in its entirety.

What is claimed is:

1. An information processing apparatus, to which an application has been installed, comprising:
   a separation unit configured to separate, in accordance with a request from the application, print setting data into allowed print setting information, in which a print setting change would not generate an inconsistency with other settings, and disallowed print setting information, in which a print setting change might generate an inconsistency with other settings;
   a generation unit configured to generate, based on the disallowed print setting information, processed information indicating that the validation process has been executed, wherein the allowed print setting information is not used to generate the processed information;
   a setting unit configured to set, to the print setting data, the processed information;
   a returning unit configured to return the print setting data, to which the processed information has been set, in accordance with the request from the application;
   a receiving unit configured to receive print setting data and application data from the application;
   a determination unit configured to determine, by comparing processed data in the received print setting data and the disallowed print setting information, whether the returned print setting data has been changed, wherein the change comprises a change which is performed via the application after the print setting data has been returned; and
   a generation control unit configured to not perform the validation process and generate print data after an application outputs the application data and the print setting data in a case where it is determined that the returned print setting data is not changed, and to perform the validation process and generate print data after the application outputs the application data and the print setting data in a case where it is determined that the returned print setting data is changed.

2. The apparatus according to claim 1, wherein the processed information is an electronic signature.

3. The apparatus according to claim 1, wherein the generation unit generates the processed information by applying a hash function to the disallowed print setting information.

4. The apparatus according to claim 1, wherein the disallowed print setting information is a paper size, and the allowed print setting information is the number of copies.

5. A print control method of an information processing apparatus, to which an application has been installed, comprising:
   separating, in accordance with a request from the application, print setting data into allowed print setting information, in which a print setting change would not generate an inconsistency with other settings, and disallowed print setting information, in which a print setting change might generate an inconsistency with other settings;
   generating, based on the disallowed print setting information, processed information indicating that the validation process has been executed, wherein the allowed print setting information is not used to generate the processed information;
   setting, to the print setting data, the processed information;
   returning the print setting data, to which the processed information has been set, in accordance with the request from the application;
   receiving print setting data and application data from the application;
   determining, by comparing processed data in the received print setting data and the disallowed print setting information, whether the returned print setting data has been changed, wherein the change comprises a change which is performed via the application after the print setting data has been returned; and
   generating print data, and not performing the validation process, after an application outputs the application data and the print setting data in a case where it is determined that the returned print setting data is not changed, and generating print data, and performing the validation process, after the application outputs the application data and the print setting data in a case where it is determined that the returned print setting data is changed.

6. The method according to claim 5, wherein the processed information is an electronic signature.

7. The method according to claim 5, wherein the processed information is generated by applying a hash function to the disallowed print setting information.

8. The method according to claim 5, wherein the disallowed print setting information is a paper size, and the allowed print setting information is the number of copies.

9. A non-transitory computer-readable storage medium storing a program for causing a computer to execute a print control method of an information processing apparatus, to which an application has been installed, the method comprising:
    separating, in accordance with a request from the application, print setting data into allowed print setting information, in which a print setting change would not generate an inconsistency with other settings, and disallowed print setting information, in which a print setting change might generate an inconsistency with other settings;
    generating, based on the disallowed print setting information, processed information indicating that the validation process has been executed, wherein the allowed print setting information is not used to generate the processed information;
    setting, to the print setting data, the processed information;
    returning the print setting data, to which the processed information has been set, in accordance with the request from the application;
    receiving print setting data and application data from the application;
    determining, by comparing processed data in the received print setting data and the disallowed print setting information, whether the returned print setting data has been changed, wherein the change comprises a change which is performed via the application after the print setting data has been returned; and
    generating print data, and not performing the validation process, after an application outputs the application data and the print setting data in a case where it is determined that the returned print setting data is not changed, and generating print data, and performing the validation process, after the application outputs the application data and the print setting data in a case where it is determined that the returned print setting data is changed.

10. The non-transitory computer-readable storage medium according to claim 9, wherein the processed information is an electronic signature.

11. The non-transitory computer-readable storage medium according to claim 9, wherein the processed information is generated by applying a hash function to the disallowed print setting information.

12. The non-transitory computer-readable storage medium according to claim 9, wherein the disallowed print setting information is a paper size, and the allowed print setting information is the number of copies.

\* \* \* \* \*